United States Patent [19]
Chabagno et al.

[11] Patent Number: 5,654,062
[45] Date of Patent: Aug. 5, 1997

[54] WATER FREE REDUCING INSULATION FOR ELECTRICAL CABLE

[75] Inventors: Jean Michel Chabagno, Pau; Gérard Junca; Philippe Montagne, both of Morlaas; Jean Pourtau, Pau, all of France

[73] Assignee: Elf Atochem S.A., Puteaux, France

[21] Appl. No.: 479,529

[22] Filed: Jun. 7, 1995

Related U.S. Application Data

[63] Continuation of Ser. No. 366,094, Dec. 29, 1994, abandoned, which is a continuation of Ser. No. 019, Jan. 4, 1993, abandoned.

[30] Foreign Application Priority Data

Jan. 6, 1992 [FR] France ............... 92 00035

[51] Int. Cl.$^6$ ............................................. B32B 9/00
[52] U.S. Cl. ............... 428/76; 428/457; 428/416; 428/516; 428/364; 428/461; 428/520; 428/373; 428/379; 525/66; 525/166; 529/425; 529/436; 529/437; 427/117; 427/314; 427/385.5; 427/388.1; 427/388.2

[58] Field of Search ............... 428/76, 416, 516, 428/364, 461, 520, 457, 379, 373, 35.7; 525/179, 66, 166, 176, 68; 524/436, 437, 425; 427/117, 384, 385.5, 388.1, 388.2

[56] References Cited

U.S. PATENT DOCUMENTS 4,868,052  9/1989  Guerdoux ............... 428/461
5,175,211  12/1992  Sunada ............... 525/66

OTHER PUBLICATIONS

Chem Abs, vol. 108 1988, p. 752 No. 10.

*Primary Examiner*—Patrick Ryan
*Attorney, Agent, or Firm*—Burns, Doane, Swecker & Mathis, L.L.P.

[57] ABSTRACT

The present invention relates to an insulating composition for electrical cable comprising a mixture of an ethylene-alkyl acrylate or ethylene-vinyl acetate copolymer and of a polymeric compound, said polymeric compound being an ethylene-alkyl acrylate-maleic anhydride terpolymer or an ethylene-vinyl acetate-maleic anhydride terpolymer, and usual additives such as, for example, a crosslinking agent, its use for the preparation of an insulation sheath of electrical cables and the insulation sheath obtained.

11 Claims, 5 Drawing Sheets

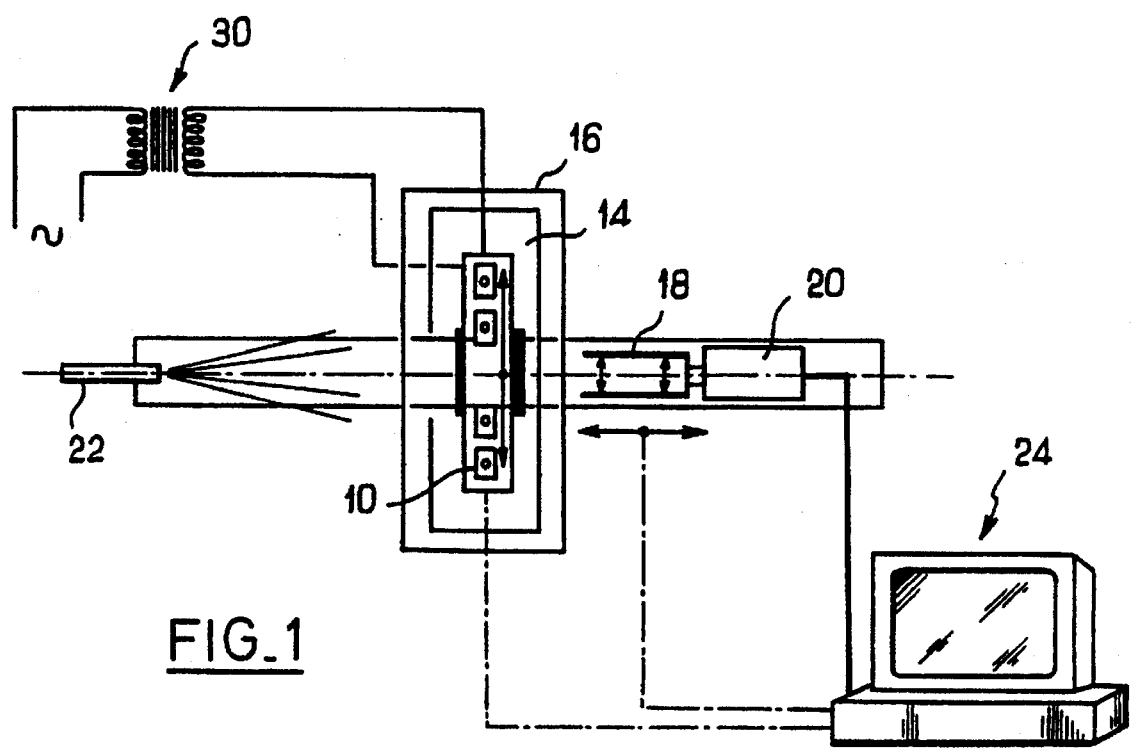
FIG. 1
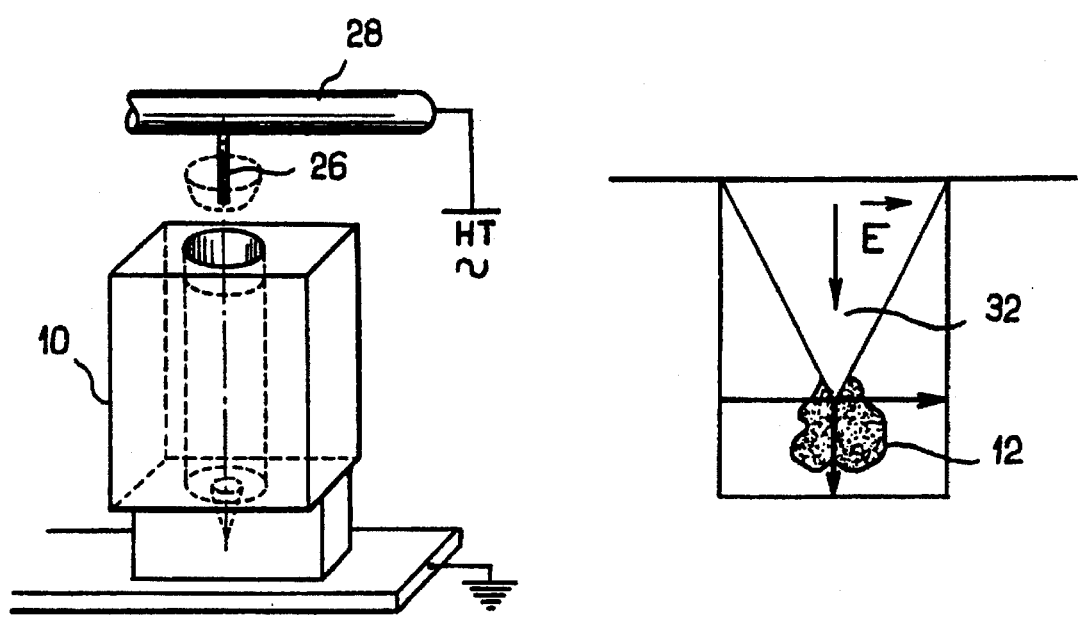
FIG. 2
FIG. 3

WATER FREE REDUCING INSULATION FOR ELECTRICAL CABLE

This application is a continuation, of application Ser. No. 08/366,094, filed Dec. 29, 1994, now abandoned; which is a continuation of Ser. No. 08/000,019, filed Jan. 4, 1993, now abandoned.

The present invention relates to an insulation for electrical cable and in particular for intermediate-voltage electrical cable. This insulation consists of a mixture of copolymer of ethylene and acrylic acid derivative and of a terpolymer of ethylene, acrylic acid derivative and maleic anhydride, crosslinked by a peroxide route.

BACKGROUND OF THE INVENTION

One of the main defects which appear in intermediate-voltage electrical cables is the formation of water trees. The water tree is an interference phenomenon which appears in cables insulated with crosslinked polyethylene. This phenomenon can generally take on two forms, namely the bow tie tree or the half-bow tie tree, also called frayed or open (vented tree). The formation of a water tree requires the combined presence of an alternating electrical field and of water. It arises from an insulation defect and propagates in the insulation until it ends in its breakdown. The lifetime of a water tree is very variable. It is between a few months and a few years. Three stages in the life of a tree can be discerned: an incubation period, a growth period, and the period of change into the electrical tree which causes the breakdown. Under the microscope the structure of the water tree is seen as a group of microchannels which are more or less mutually connected.

To try and overcome these disadvantages it has first of all been recommended to use hydrophilic material in combination with the crosslinked polyethylenes, these being intended to delay the appearance and the growth of the trees. Next, compounds of the silane type or copolymers of ethylene and alkyl acrylate, such as ethyl or butyl acrylates, have been used in combination with these polyethylenes. Thus, Japanese Patent JP-A-02 311121 describes, as electrical insulation for cable, a mixture of polyethylene with an ethylene-acrylate copolymer or an ethylene-acrylic acid copolymer or an ethylene-vinyl acetate copolymer grafted with maleic acid or an ethylene-acrylate copolymer grafted with maleic acid.

In practice, however, it has been found that previously recommended solutions are not entirely satisfactory, because breakdowns of electrical cables as a result of formation of a water tree continue to occur much too frequently.

SUMMARY OF THE INVENTION

The objective of the present invention has been precisely to improve the insulating compositions for electrical cables so as to delay much more significantly the appearance and the development of the water tree phenomena.

According to the present invention the insulation claimed is a composition which comprises a mixture of an ethylene-alkyl acrylate or ethylene-vinyl acetate copolymer and of an ethylene-alkyl acrylate-maleic anhydride terpolymer or of an ethylene-vinyl acetate-maleic anhydride terpolymer.

DESCRIPTION OF THE PREFERRED EMBODIMENTS

In the mixture according to the invention the copolymer may represent from 50 to 99% by weight, with 50 to 1% of terpolymer, and preferably from 80 to 99 parts by weight of copolymer and from 1 to 20 parts by weight of terpolymer.

In practice it has additionally been found that, in order to improve the properties of the mixture according to the invention, it is recommended that the melt index (MI) of the terpolymer should be higher than or equal to that of the copolymer.

In the case of the copolymer or terpolymer, the alkyl acrylate is preferably chosen from methyl acrylate, ethyl acrylate or butyl acrylate.

The ethylene-alkyl acrylate and ethylene-vinyl acetate copolymers and the terpolymers as referred to above are commercial products which are known per se.

The copolymers which can be employed in the mixture are preferably those with a low content of alkyl acrylate or vinyl acetate. This weight content is advantageously between 0.5 and 10%, preferably between 2 and 5%, in relation to the total weight of said copolymer.

The terpolymers which can be employed in the mixture have weight contents of alkyl acrylate or vinyl acetate which are generally between 5 and 40%, preferably between 10 and 20%, in relation to the total weight of said terpolymer, and weight contents of maleic anhydride are advantageously between 0.1 and 10%, preferably between 0.1 and 5%, in relation to the total weight of terpolymer.

Usual additives, such as antioxidants and/or free-radical initiators employed as crosslinking agents may also be added to the compositions according to the present invention.

The terpolymers which can be employed within the scope of the present invention can be manufactured, for example, by the use of a process as described in Patent FR-A-2,498,609. This patent describes, in fact, a process for the manufacture of radical ethylene terpolymers containing units derived from a (meth)acrylate and units derived from maleic anhydride, by high-pressure copolymerization of a mixture of ethylene, of (meth)acrylic acid ester and of maleic anhydride in the presence of at least one free-radical initiator.

Such processes for the manufacture of radical ethylene terpolymers can also be illustrated by documents EP-A-0,174,244 and EP-A-0,177,378.

The blending of the copolymer with the terpolymer can be carried out by any conventional means well known to a person skilled in the art, for example in an extruder.

Aging tests and measurements of propagation of the trees, which have made it possible to demonstrate the advantageous and wholly unexpected properties of the compositions according to the invention were performed under the following conditions.

The experimental procedure of these tests will be described in greater detail below with reference to the attached drawings, in which:

BRIEF DESCRIPTION OF THE DRAWINGS

FIG. 1 shows diagrammatically the apparatus in which the study of trees was performed;

FIG. 2 shows a sample comprising a molding defect promoting the development of a tree;

FIG. 3 shows, on a larger scale, the point of the sample of FIG. 2, at which the tree develops.

Figure 4:
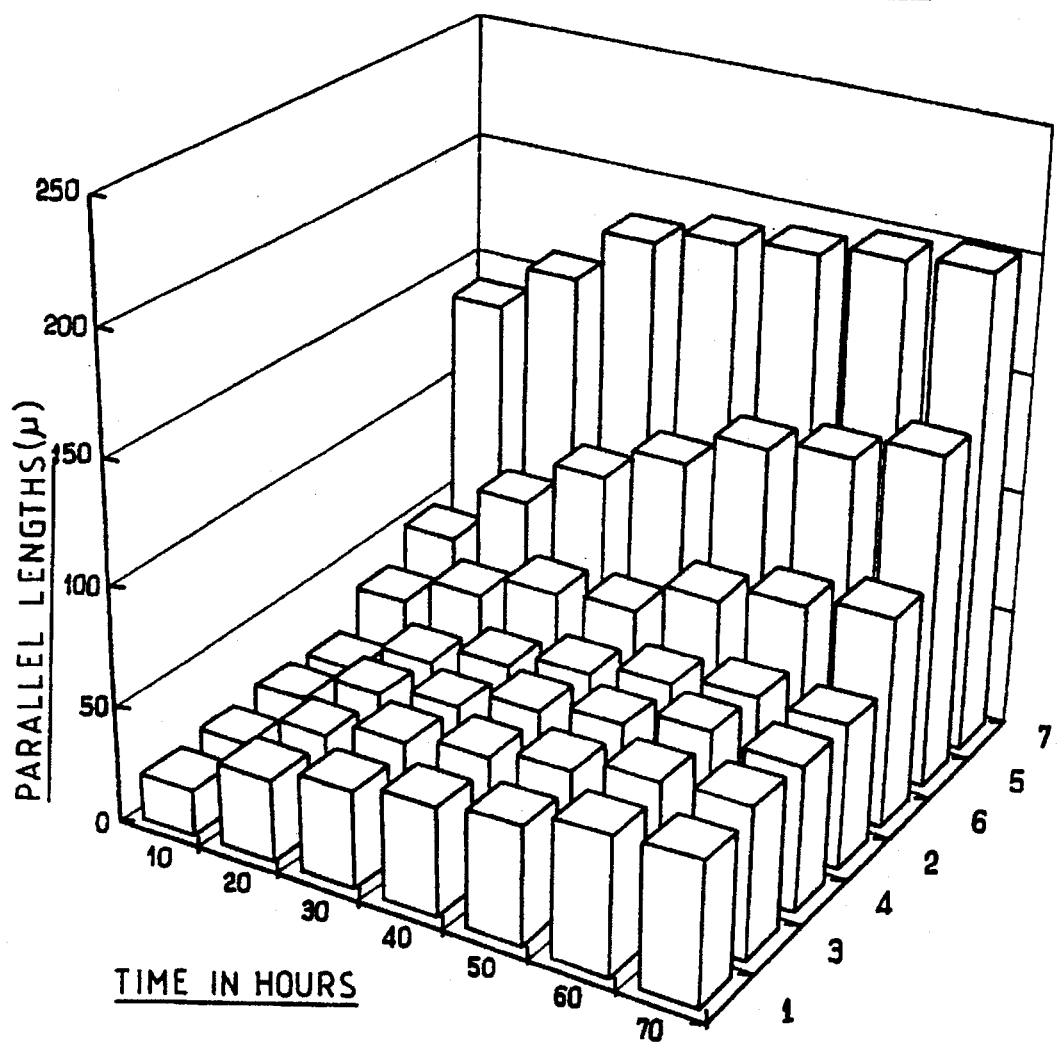
FIGS. 4 to 7 show the results obtained with a number of examples of compositions according to the invention, in comparison with compositions of the prior art.

The study of the water trees is based on the principle consisting in promoting, under the effect of the application of a high-frequency high voltage, the development of a tree (12) in samples (10) in which a defect has been created artificially by molding.

The sample carrier (14) fastened to a movable table (16) moves in front of the objective of a microscope (18) linked to a miniature video camera (20) in order to display the tree. An illuminating device (22) intended to make it easier to display the tree phenomenon is also provided. The camera (20) is linked to a microcomputer (24) via an image processing board controlled by software which enables the dimensions of the tree (12) to be determined.

The samples (10) filled with a conductive liquid ($H_2O$+ NaCl) are subjected to an alternating high voltage of 7000 V at 1500 hertz, by means of platinum electrodes (26) immersed in the solution, these being themselves powered by a conducting rod (28) connected to the transformer (30).

The movement of the samples (10), programmed in time, makes it possible to define the speed at which the tree develops.

As illustrated by the attached Figures, the samples (10) are driven in translational motions both parallel to and perpendicularly to the electrical field E to which the samples (10), and more particularly the points (32) of the samples (10), are subjected. It has been possible to conduct these experiments under perfectly reliable conditions, especially by virtue of the development of a first software for controlling the movement of the samples and their optical focusing. A second software has made it possible to carry out automatically the processing of the observed tree images, the storage of the acquired values and the calculation of the rates of development of the tree. In addition, the software has made it possible to create automatically graphs corresponding to the lengths and rates of propagation of the observed trees, both in the parallel direction and in the direction perpendicular to the electrical field, as a function of time. These graphs form the subject of the appended FIGS. 4 to 7.

The following examples illustrate the invention without, however, any intention to limit its scope.

All the samples were prepared as follows:

All the ingredients forming part of the formulation of the tree-retarder blends are incorporated in a conventional extruder and are extruded at 100° C.

Starting with the granulates obtained, an impregnation with 2% of dicumyl peroxide is performed at 90° C. for four hours in a Rotovapor.

The peroxide-impregnated granulates are then press-molded (25 bars, 180° C. for 10 minutes) in a mold produced for this purpose so as to obtain test pieces such as that illustrated in FIG. 2.

A check is made that this test piece includes in its bottom part a point (32) around which the tree will develop (12).

Degassing is then carried out under vacuum in an oven (70° C.) for a week in order to extract any polar volatile constituent produced by dicumyl peroxide decomposition.

The samples are then placed on the test bench, where the growth of the tree which develops is measured parallel to and perpendicularly to the electrical field, as illustrated in FIG. 3.

Table I, which follows, describes compositions 1 to 4 according to the invention, obtained under the conditions defined above.

Table II describes compositions 5 to 7, illustrating the prior art, in particular JP-A-02 311121 in the case of composition 7.

The percentages shown are by weight in relation to the total composition.

TABLE I

| COMPOSITIONS ACCORDING TO THE INVENTION | | | | |
|---|---|---|---|---|
| Numbers | 1 | 2 | 3 | 4 |
| E/MA (98/2) | 87.8% | 87.8% | | |
| E/VA (98/2) | | | 87.8% | 87.8% |
| E/BA/MAnh (88/9/3) | 10.0% | | 10.0% | |
| E/VA/MAnh (80/19.5/0.5) | | 10.0% | | 10.0% |
| Irganox* 1081 | 0.2% | 0.2% | 0.2% | 0.2% |
| Dicup** | 2.0% | 2.0% | 2.0% | 2.0% |

The abbreviations are defined as follows:
E/MA: ethylene-methyl acrylate copolymer; MI = 2;
E/VA: ethylene-vinyl acetate copolymer; MI = 2;
E/BA/MAnh: ethylene-butyl acrylate-maleic anhydride terpolymer; MF = 40;
E/VA/MAnh: ethylene-vinyl acetate-maleic anhydride terpolymer; MI = 7;
Irganox* 1081: 2,2'-thiobis(4-tert-butyl-3-methylphenol) [antioxidant]
Dicup**: dicumyl peroxide

TABLE II

| COMPOSITIONS NOT IN ACCORDANCE WITH THE PRESENT INVENTION, BY WAY OF COMPARISON | | | |
|---|---|---|---|
| Numbers | 5 | 6 | 7 |
| PE | 97.8% | | 87.8% |
| E/MA(98/2) | | 97.8% | |
| E/EA(82/18) | | | 10.0% |
| Irganox* 1081 | 0.2% | 0.2% | |
| Dicup** | 2.0% | 2.0% | 2.0% |
| Santonox*** | | 0.2% | |

PE: polyethylene; MI = 2;
E/EA: ethylene/ethyl acrylate copolymer;
Santonox***: 4,4'-thiobis(6-tert-butyl-3-methylphenol) [antioxidant]

Aging tests and measurements of propagation of the trees were performed in the case of compositions 1 to 7 under the conditions given above.

Figure 5:
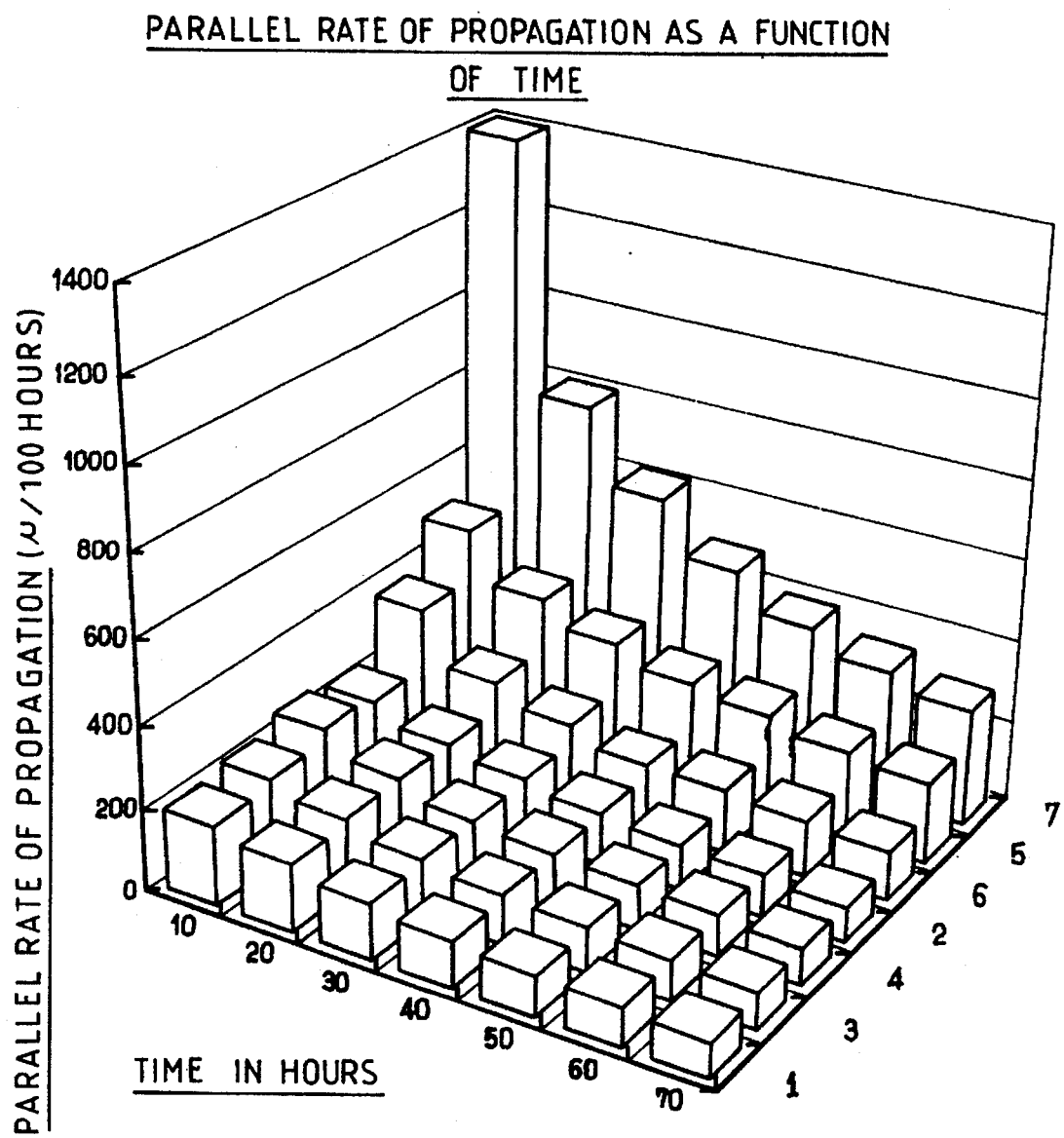
Figure 6:
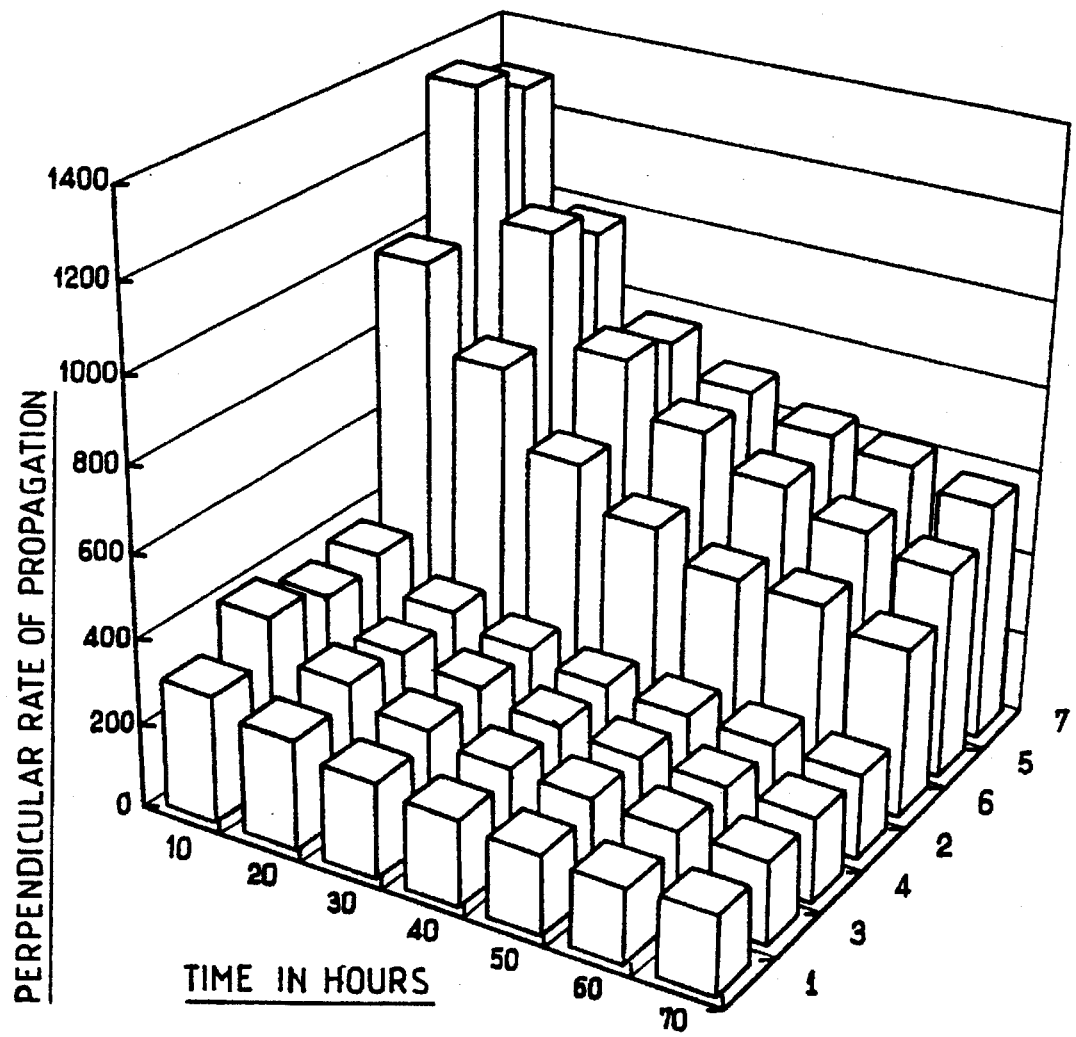
Figure 7:
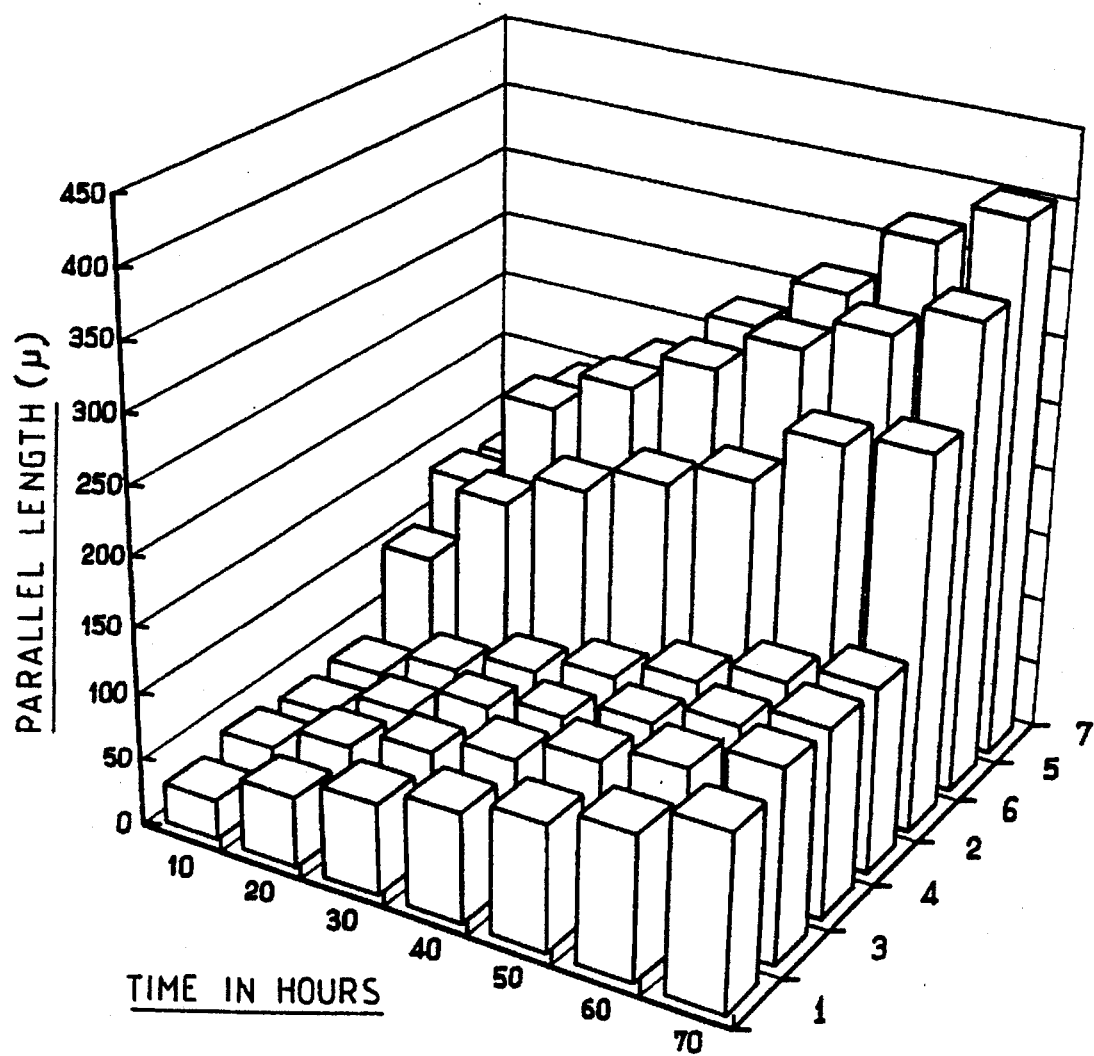

The results obtained are plotted in diagrams shown by FIGS. 4 and 5 in the case of the length and rate of propagation parallel to the trees as a function of time, and FIGS. 6 and 7 in the case of the same parameters corresponding to the development of the trees perpendicularly to the electrical field.

Analysis of these diagrams makes it possible to distinguish the homogeneous group of the compositions according to the invention from the compositions illustrating the prior art.

The lengths of the trees obtained with the compositions of the present invention are 1.6 to 7 times smaller than those obtained in the compositions illustrating the prior art.

Similarly, the rate of propagation of the trees is markedly decreased in the case of the compositions of the present invention.

These improvements, found in the growth of the trees parallel to the electrical field, are particularly unexpected in the case of their growth perpendicular to this same field. The diagrams shown in FIGS. 6 and 7, appended, clearly mark the distinction between the compositions according to the present invention and those illustrating the prior art.

Such properties make it advantageous to employ the compositions according to the present invention for the preparation of insulation sheaths of electrical cables.

These sheaths can be obtained by the usual techniques known to a person skilled in the art, such as molding and/or extrusion.

What is claimed is:

1. An insulating composition for electrical cable for reducing water tree development comprising a mixture of an ethylene-alkyl acrylate or ethylene-vinyl acetate copolymer and of a polymeric compound, in which the polymeric compound is an ethylene-alkyl acrylate-maleic anhydride terpolymer or an ethylene-vinyl acetate-maleic anhydride terpolymer said proportions of terpolymer and copolymer being present in effective amounts such that said water trees have a parallel length of less than 50 μm after 10 hours in a conductive solution of water and NaCl at an alternating vintage of 7000r at 1500 hertz by means with platinum electrodes immersed in said solution.

2. The composition of claim 1, wherein the melt index of the terpolymer is higher than or equal to that of the copolymer.

3. The composition of claim 1, wherein the alkyl acrylate is chosen from methyl acrylate, ethyl acrylate and butyl acrylate.

4. The composition of claim 1, wherein the copolymer has a low content of alkyl acrylate or of vinyl acetate, which is between 0.5 and 10% by weight, in relation to the total weight of said copolymer.

5. The composition of claim 1, wherein said terpolymer has a content of alkyl acrylate or of vinyl acetate of between 5 and 40% by weight in relation to the total weight of said terpolymer.

6. The composition of claim 1, wherein said terpolymer has a maleic anhydride content of between 0.1 and 5% by weight, in relation to the total weight of the terpolymer.

7. The composition of claim 1, which further comprises additives of antioxidants, free-radical initiators or mixtures thereof.

8. A method for the preparation of an insulation sheath of electrical cables comprising contacting an electrical cable with the composition of claim 1.

9. An insulation sheath for electrical cables comprising an insulating composition as described in claim 1.

10. The composition of claim 1, wherein the copolymer has a low content of alkyl acrylate or of vinyl acetate, which is between 2 and 5% by weight in relation to the total weight of said copolymer.

11. The composition of claim 1, wherein said terpolymer has a content of alkyl acrylate or of vinyl acetate of between 10 and 20% by weight in relation to the total weight of said terpolymer.

* * * * *